US006238500B1

(12) United States Patent
Blomquist

(10) Patent No.: US 6,238,500 B1
(45) Date of Patent: May 29, 2001

(54) SMOKELESS GAS GENERATING MATERIAL

(75) Inventor: Harold R. Blomquist, Gilbert, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/361,058

(22) Filed: Jul. 26, 1999

(51) Int. Cl.$^7$ .......................... C06B 47/00; C06B 47/04; B60R 21/28

(52) U.S. Cl. .......................... 149/74; 149/1; 149/19.91; 149/19.4; 149/19.5; 280/736; 280/737; 280/741

(58) Field of Search .......................... 149/1, 19.91, 19.4, 149/19.5, 74; 280/736, 737, 741

(56) References Cited

U.S. PATENT DOCUMENTS

| | | | |
|---|---|---|---|
| H1778 | * 6/1999 | Wagaman et al. | 149/109.6 |
| 3,744,427 | * 7/1973 | Good et al. | 149/2 |
| 3,899,374 | * 8/1975 | Sylkhouse | 149/2 |
| 3,902,933 | * 9/1975 | Chandler | 149/2 |
| 4,023,996 | * 5/1977 | Leneveu | 149/19.8 |
| 4,681,643 | * 7/1987 | Colgate et al. | 149/21 |
| 4,758,287 | * 7/1988 | Pietz | 149/2 |
| 5,185,111 | 2/1993 | Lazar | 264/49 |
| 5,415,845 | 5/1995 | Brede et al. | 280/736 |
| 5,451,277 | * 9/1995 | Katzakian | 149/19.92 |
| 5,466,313 | * 11/1995 | Brede et al. | 149/1 |
| 5,589,141 | * 12/1996 | Sides et al. | 280/741 |
| 5,607,181 | 3/1997 | Richardson | 280/737 |
| 5,669,629 | 9/1997 | Rink | 280/741 |
| 5,683,104 | 11/1997 | Smith | 280/730 |
| 5,709,406 | 1/1998 | Buchanan | 280/737 |
| 5,713,595 | 2/1998 | Mooney et al. | 280/736 |
| 5,747,730 | * 5/1998 | Scheffee et al. | 149/47 |
| 5,861,571 | * 1/1999 | Scheffee et al. | 102/288 |
| 5,882,036 | * 3/1999 | Moore et al. | 280/736 |
| 5,979,936 | 11/1999 | Moore et al. | 280/736 |

* cited by examiner

Primary Examiner—Michael J. Carone
Assistant Examiner—Glenda L. Sanchez
(74) Attorney, Agent, or Firm—Tarolli, Sundheim, Covell, Tummino & Szabo L.L.P.

(57) ABSTRACT

An inflator (14) for inflating an inflatable vehicle occupant protection device (12) comprises a pressurized container (20), a gas generating material stored under pressure in the container (20), and an igniter (36) for igniting the gas generating material in the container. The gas generating material comprises an oxidizer and a fuel. At least a major portion of the oxidizer is nitrous oxide in a liquid-gas state. At least a major portion of the fuel is polyvinyl alcohol in a porous, molded solid state (64). A portion of the liquid nitrous oxide is absorbed into the pores of the molded polyvinyl alcohol (64). The gas generating material upon combustion produces a combustion product consisting essentially of carbon dioxide, nitrogen, and water.

27 Claims, 1 Drawing Sheet

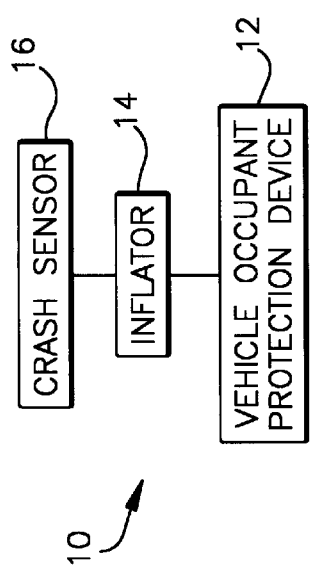
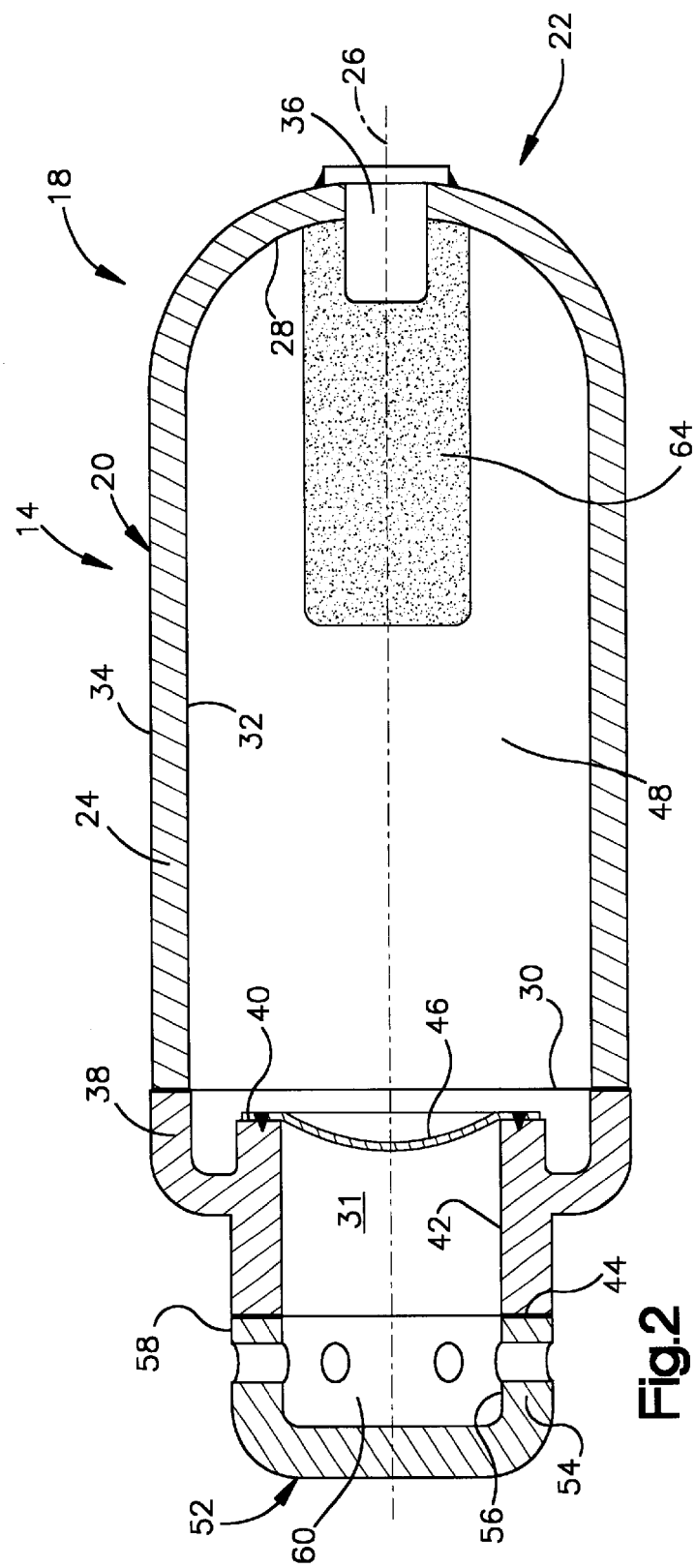
Fig.1
Fig.2

SMOKELESS GAS GENERATING MATERIAL

TECHNICAL FIELD

The present invention relates to an apparatus comprising an inflatable vehicle occupant protection device and a gas generating material for producing inflation gas for inflating the inflatable vehicle occupant protection device.

BACKGROUND OF THE INVENTION

An inflatable vehicle occupant protection device, such as an air bag, is inflated by inflation gas provided by an inflator. The inflator contains a gas generating material. The inflator further includes an igniter. The igniter is actuated to ignite the gas generating material when the vehicle experiences a collision for which inflation of the air bag is desired. As the gas generating material burns, it generates a volume of inflation gas. The inflation gas is directed into the air bag to inflate the air bag. When the air bag is inflated, it expands into the vehicle occupant compartment and helps to protect the vehicle occupant.

It is known to use, in a gas generating material, a nitrous oxide ($N_2O$) oxidizer and a volatile liquid fuel such as a hydrocarbon or an alcohol. At the storage and operating pressures conventionally used for such gas generating material, nitrous oxide is in a gaseous state and the fuel is in a liquid state. An inflator using such gas generating material requires a containment system for the gas generating material which is leak-proof for the life of the inflator. In addition, since the fuel is a liquid, the surface or reaction area presented by the fuel for reaction with the nitrous oxide gas can vary substantially from one moment to the next and/or be irregular, resulting in variable and unpredictable burn rates.

SUMMARY OF THE INVENTION

In accordance with the present invention, an inflator for inflating an inflatable vehicle occupant protection device comprises a pressurized container, a gas generating material stored under pressure in the container, and an igniter for igniting the gas generating material in the container. The gas generating material comprises an oxidizer and a fuel. At least a major portion of the oxidizer is nitrous oxide in a liquid-gas state. At least a major portion of the fuel is polyvinyl alcohol in a porous, molded solid state. A portion of the liquid nitrous oxide is absorbed into the pores of the molded polyvinyl alcohol. The gas generating material upon combustion produces a combustion product consisting essentially of carbon dioxide, nitrogen, and water.

The porous, molded solid state of the polyvinyl alcohol presents a defined surface or reaction area for reaction of the polyvinyl alcohol with the liquid nitrous oxide. The defined surface or reaction area is reproducible to provide repeatable and predictable burn rates.

BRIEF DESCRIPTION OF THE DRAWINGS

The foregoing and other features of the invention will become apparent to one skilled in the art upon consideration of the following description of the invention and the accompanying drawings in which:

FIG. 1 is a schematic view of a vehicle occupant protection apparatus embodying the present invention; and FIG. 2 is an enlarged sectional view of a part of the apparatus of FIG. 1.

DESCRIPTION OF PREFERRED EMBODIMENTS

Referring to FIG. 1, a vehicle occupant protection apparatus 10 includes an inflatable vehicle occupant protection device 12. In the preferred embodiment of the present invention, the inflatable vehicle occupant protection device 12 is an air bag. The inflatable vehicle occupant protection device 12 could be, for example, an inflatable seat belt, an inflatable knee bolster, an inflatable head liner or side curtain, or a knee bolster operated by an air bag.

An inflator 14 is associated with the vehicle occupant protection device 12. The inflator 14 is actuatable to direct inflation gas to the inflatable vehicle occupant protection device 12 to inflate the inflatable vehicle occupant protection device 12.

A crash sensor 16 actuates the inflator 14. The crash sensor 16 is a known device that senses a vehicle condition, such as vehicle deceleration, indicative of a collision. The crash sensor 16 measures the magnitude and the duration of the deceleration. If the magnitude and duration of the deceleration meet predetermined threshold levels, the crash sensor 16 either transmits a signal or causes a signal to be transmitted to actuate the inflator 14. The inflatable vehicle occupant protection device 12 is then inflated and extends into the occupant compartment of the vehicle to help protect a vehicle occupant from a forceful impact with parts of the vehicle.

As shown in FIG. 2, the inflator 14 includes a housing 18. The housing 18 includes a pressurized container 20. The container 20 includes a generally cylindrical side wall 24 extending along a central axis 26 between an open end 30 and a closed end 28. The side wall 24 includes a cylindrical inner surface 32 and a cylindrical outer surface 34.

The housing 18 further includes an actuatable pyrotechnic igniter 36 which extends through the closed end 28 of the housing 18. The igniter 36 includes an ignitable material (not shown).

The housing 18 also includes an end cap 38 secured to the open end 30 of the container 20 by any suitable means, such as a weld. The end cap 38 includes an axially extending tubular portion that provides a radially extending first surface 40 at one end and an axially extending cylindrical inner surface 42. The cylindrical surface 42 of the end wall 38 has a diameter smaller than the diameter of the inner surface 32 of the side wall 24 and defines a passage 31 through the end cap 38. The cylindrical surface 42 extends axially between and connects the first surface 40 of the tubular portion of the end cap 38 and a radially extending second surface 44 at the opposite end of the tubular portion.

A burst disk 46 is secured to the first surface 40 of the end cap 38 by any suitable means, such as a weld. The burst disk 46 closes the passage 31. Together the burst disk 46 and the end cap 38 close the open end 30 of the side wall 24 to define a closed chamber 48 in the container 20. The chamber 48 is defined by the end cap 38, the burst disk 46, and the cylindrical side wall 24.

A diffuser 52 is connected to the second surface 44 of the end cap 38 by any suitable means, such as a weld. The diffuser 52 includes a cylindrical side wall 54 coaxial with the side wall 24 of the container 20 and centered on the axis 26. The side wall 54 includes a cylindrical inner surface 56 and cylindrical outer surface 58. The diffuser has a central chamber 60. The chamber 60 is in fluid communication with the passage 31 in the end cap 38.

In accordance with the present invention, a gas generating material is stored in the chamber 48 under pressure. The gas generating material comprises an oxidizer and a fuel. At least a major portion of the oxidizer is nitrous oxide ($N_2O$) in a liquid-gas state. A liquid-gas state is one wherein the nitrous oxide is in a partially liquid and partially gaseous state when stored under pressure in the chamber 48.

By "major portion of the oxidizer", it is meant that the oxidizer of the gas generating material comprises sufficient nitrous oxide that the combustion characteristics of the oxidizer are dominated by the nitrous oxide. The oxidizer preferably is at least about 95% nitrous oxide.

The oxidizer can also include up to about 5 weight percent, based on the weight of the gas generating material, of a supplemental source of oxygen such as salts of oxyacids of nitrogen, salts of oxyacids of chlorine, metal oxides, or mixtures thereof. The cation of the salts of oxyacids of nitrogen or chlorine can be an ammonia derivative, a metal, or a complex of one or more non-metal ligands.

Nitrous oxide ($N_2O$) is a colorless gas with a density of 1.52 g/L at room temperature and atmospheric pressure. Nitrous oxide has a critical pressure of 72.7 bars and a critical temperature of 36.4° C., which allows it to be easily liquified at pressures above atmospheric pressure.

The oxidizer is stored within the chamber 48 under a pressure sufficient substantially to liquefy the nitrous oxide. The amount of pressure depends upon such factors as the amount of nitrous oxide stored in the chamber 48 and the volume of the chamber 48 storing the nitrous oxide. Preferably, the nitrous oxide is stored at a pressure of at least about 500 pounds per square inch (psi). More preferably, the nitrous oxide is stored in the chamber 48 at a pressure of at least about 750 psi.

One advantage of utilizing nitrous oxide as an oxidizer in the present invention is that nitrous oxide has an oxidizing capacity twice that of air. Moreover, in contrast to pure oxygen or air, nitrous oxide behaves as an inert gas up to at least 200° C. so that automotive systems using nitrous oxide are free of quiescent oxidation processes when exposed to normal high temperatures. As a result, nitrous oxide is safe to handle, thermally stable, easy to store, and not subject to certain manufacturing concerns.

At least a major portion of the fuel in the present invention is polyvinyl alcohol in a porous, molded solid state. By "major portion of the fuel", it is meant that the fuel of the gas generating material comprises sufficient solid state polyvinyl alcohol that the combustion characteristics of the fuel are dominated by the polyvinyl alcohol.

Polyvinyl alcohol can be represented by the following formula:

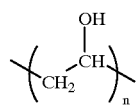

Polyvinyl alcohol is a water soluble synthetic polymer made by the alcoholysis of polyvinyl acetate. It is commercially available as a white or cream powder in a range of molecular weights, from a low molecular weight, low viscosity grade (below 35,000 molecular weight) to a super high viscosity grade (250,000 to 300,000 molecular weight). A preferred molecular weight in the present invention is within the range between a low viscosity grade which is 87% to 89% hydrolyzed and has an average molecular weight of about 13,000 to 23,000 to a mid-viscosity grade which is 99+% hydrolyzed and has an average molecular weight of about 124,000 to 186,000.

An advantage to using polyvinyl alcohol as a fuel in the gas generating material of the present invention is that the polyvinyl alcohol is capable of being formed into a porous, molded solid structure 64. A porous, molded solid structure 64 is beneficial for providing repeatable and predictable burn rates. The burn rate of the gas generating material is dependent upon the reaction area of the gas generating material. A porous, molded solid structure 64 presents a defined reaction area for combustion of the fuel with the nitrous oxide. The defined reaction area of the porous, molded solid structure 64 is reproducible to provide repeatable and predictable burn rates.

The porous, molded solid structure 64 of polyvinyl alcohol is prepared in accordance with the method disclosed in U.S. Pat. No. 5,185,111, METHOD OF PRODUCING ELASTOMERIC OPEN CELLED STRUCTURE. The method includes forming a homogenous mixture including polyvinyl alcohol in granular form combined with a void former and a polyhydroxy alcohol. Examples of suitable void formers are water soluble salts such as sodium chloride, sodium nitrate, and magnesium sulfate. Examples of suitable polyhydroxy alcohols are polyethylene glycol, polypropylene glycol, 1,3-propanediol, glycerol, 1,2-butanediol, triethylene glycol, diethylene glycol, triethanolamine, and diethanolamine. The ratio by weight between the polyvinyl alcohol and the polyhydroxy alcohol is preferably from 18:1 to 3:1. The weight ratio of void former to polyvinyl alcohol is about 2:1 to about 10:1. The void former, polyvinyl alcohol, and polyhydroxy alcohol are admixed at approximately room temperature and then shaped at a low temperature by, for instance, extrusion or injection molding. The function of the polyhydroxy alcohol is to lower the softening or melting point of the polyvinyl alcohol. This permits the mixture to be shaped by extrusion or injection molding at the lower temperature. The mixture is then cooled and the void former is extracted by, for instance, leaching with a suitable solvent, such as water.

Optionally, the polyvinyl alcohol may be cross-linked, using conventional cross-linking techniques. Cross-linking provides increased mechanical strength and dimensional stability. Preferably, the porous, molded solid structure 64 of polyvinyl alcohol has some elasticity to minimize abrasion of the structure 64 caused by vehicle movement. The porous, molded solid structure 64 of polyvinyl alcohol manufactured by the method of U.S. Pat. No. 5,185,111 inherently has some elasticity. The cross-linking, if used, should be controlled so as to retain this elasticity.

The structure 64 so formed is defined by a multitude of ligands which are generally of uniform dimension and interconnected so as to provide a plurality of open cells (voids) which are open to each other similar to the configuration of a conventional sponge. Preferably, for purposes of the present invention, the void former is sized so that the open cells of the solid structure 64 have an average diameter of about 3 microns to about 20 microns. More preferably, the open cells have an average diameter of about 3 microns to about 10 microns. The void former must be chemically inert so as not to react with the polyvinyl alcohol.

The porous, molded solid structure 64 of polyvinyl alcohol may be in the shape of a single pellet or a plurality of pellets. Each pellet of the solid structure 64 shaped into a plurality of pellets has a configuration similar to that of an aspirin tablet. Preferably, the pellets of polyvinyl alcohol contain area increasing features such as perforations or slots. Perforations or slots enhance mass flow of the combustion product away from the pellets during combustion of the pellets. The formation of aspirin-shaped pellets is achieved in the extrusion process by periodically cutting the extrudate to desired lengths prior to cooling and leaching of the void former.

When the porous, molded solid structure 64 of polyvinyl alcohol and the liquid-gas oxidizer of nitrous oxide are combined in the chamber 48, a portion of the nitrous oxide is absorbed into the porous, molded solid structure 64 by capillary attraction. A substantial portion of the nitrous oxide that is absorbed in the porous, molded solid structure 64 bonds to the hydroxyl sites of the polyvinyl alcohol by hydrogen bonding. This causes a substantial portion of the nitrous oxide absorbed in the porous, molded solid structure 64 to be gelled or otherwise immobilized in the porous, molded solid structure 64.

The amount of oxidizer, e.g., nitrous oxide, and the amount of fuel, e.g., polyvinyl alcohol, in the gas generating material are those amounts that, upon combustion of the gas generating material, are effective to produce a combustion gas product which consists essentially of carbon dioxide, nitrogen and water. A preferred amount of nitrous oxide in the gas generating material is about 60% to about 95% by weight based on the weight of the gas generating material. A preferred amount of polyvinyl alcohol is about 5% to about 25% based on the weight of the gas generating material.

The gas generating material of the present invention may comprise other ingredients which may be mixed with the liquid-gas oxidizer and/or incorporated into the porous, molded solid structure 64 of polyvinyl alcohol.

The gas generating material can comprise an anti-freeze agent which suppresses freezing of the gas generating material at or above −40° C. A preferred anti-freeze agent is ethyl alcohol. The addition of ethyl alcohol to the gas generating material does not adversely affect the combustion characteristics of the gas generating material since ethyl alcohol acts as a fuel. The gas generating material can include about 1% to about 5% ethyl alcohol based on the weight of the gas generating material. At least 1% ethyl alcohol based on the weight of the gas generating material is desirable to suppress the freezing of the gas generating material at or above −40° C.

The gas generating material can also comprise water in an amount of 0 to about 15% based on the weight of the gas generating material. An amount of 0 to about 15% water is desirable to cool the products of combustion of the oxidizer and fuel for use in an inflator 14. Preferably, the products of combustion are cooled to a temperature less than about 2500K, more preferably to a temperature in the range of about 1800K to about 2500K. By cooling the products of combustion, the inflator 14 and vehicle occupant protection device 12 can be made of components which are lighter in weight and less expensive.

The gas generating material can also comprise a burn rate catalyst such as chromium compounds, copper compounds, and other energetic salts and compounds thereof.

A mixture of one or more reactive gases and/or inert gases may also be stored with the gas generating material in the chamber 48 under pressure. For example, a reactive gas such as oxygen, butane, or hydrogen can be stored with the gas generating material in the chamber 48 to supplement combustion of the gas generating material. In addition, an inert gas such as helium can be stored with the gas generating material in the chamber 48 to facilitate leak checking of the inflator 14 or, more specifically, the chamber 48. Alternatively, or in addition, an inert gas, such as argon, helium, xenon, carbon dioxide or a mixture thereof, can be included in the chamber 48 to supplement the gas produced upon the combustion of the gas generating material and reduce the average temperature of the gas produced upon combustion of the gas generating material. Another benefit of adding a mixture of one or more inert gases to the gas generating material is to modify the equilibrium between the nitrous oxide in the gas state and the nitrous oxide in the liquid state.

Upon the occurrence of sudden vehicle deceleration indicative of a collision for which inflation of the vehicle occupant protection device 12 is desired, the crash sensor 16 transmits or causes a signal to be transmitted from a power source (not shown) to ignite the ignitable material of the pyrotechnic igniter 36. Burning of the ignitable material produces heat which ignites the gas generating material. The gas generating material combusts and produces both heat and a combustion gas product that consists essentially of carbon dioxide, nitrogen, and water. The heat and combustion gas product increase the pressure in the chamber 48. The increased pressure ruptures the burst disk 46, which opens the chamber 48 and allows the gases to flow through the opening 31, the diffuser chamber 60, and the radially extending flow passages 54 and into the inflatable vehicle occupant protection device 12. The inflatable vehicle occupant protection device 12 is thus inflated to help protect a vehicle occupant from forcibly striking parts of a vehicle.

The following examples illustrate the present invention.

EXAMPLES 1–5

The following formulations (amounts in weight percent based on the weight of the gas generating material) were compared. All of the formulations are within the scope of the present invention.

TABLE 1

| Formulations | EX 1 | EX 2 | EX 3 | EX 4 | EX 5 |
|---|---|---|---|---|---|
| PVA | 16.6 | 11.7 | 10.8 | 10.0 | 9.2 |
| Ethanol | 0 | 5 | 5 | 5 | 5 |
| Nitrous Oxide | 83.3 | 83.2 | 79.2 | 75 | 70.8 |
| Water | 0 | 0 | 5 | 10 | 15 |

The polyvinyl alcohol is in the form of a porous solid structure made according to the method of U.S. Pat. No. 5,185,111. Alternatively, the polyvinyl alcohol can be fabricated into its final form by processes compatible with this material such as extrusion and molding.

The structure is one of a stacked plurality of aspirin tablets. Each tablet has a density of about 0.0407 lb/in$^3$. The pores in the tablets have an average diameter of about 10 microns. The tablets are supported in the container 20 by a suitable perforated cage (not shown) affixed to the inside of the container 20.

The gas generating material is stored under a pressure of about 2000 psi so that the nitrous oxide is in essentially a liquid state and absorbed substantially into the polyvinyl alcohol structure.

Thermochemical calculations for the combustion of 100 gram samples of each of the formulations of Examples 1–5 were performed. The thermochemical calculations were performed using an initial combustion temperature of 298K, a chamber pressure of 2,000 psi and an exhaust pressure of 20 psi. The thermochemical calculation results, including the exhaust gas compositions, for Examples 1–5 are given in Table 2.

TABLE 2

|  | EX 1 | EX 2 | EX 3 | EX 4 | EX 5 |
| --- | --- | --- | --- | --- | --- |
| Thermochemical Calculations | | | | | |
| Flame Temp. K. | 3335 | 3335 | 3164 | 2986 | 2796 |
| Chamber CP/CV | 1.23 | 1.23 | 1.22 | 1.22 | 1.21 |
| Exhaust Temp. K. | 1762 | 1762 | 1589 | 1420 | 1267 |
| Exhaust CP/CV | 1.24 | 1.24 | 1.24 | 1.24 | 1.25 |
| Exhaust Composition, major components, calculated moles per 100 grams | | | | | |
| Total | 3.50 | 3.50 | 3.60 | 3.70 | 3.82 |
| $N_2$ | 1.89 | 1.89 | 1.80 | 1.70 | 1.61 |
| $H_2$ | 0.02 | 0.02 | 0.03 | 0.03 | 0.05 |
| $H_2O$ | 0.84 | 0.84 | 1.07 | 1.30 | 1.52 |
| $CO_2$ | 0.68 | 0.68 | 0.66 | 0.63 | 0.60 |
| CO | 0.07 | 0.07 | 0.05 | 0.04 | 0.03 |
| NO | <0.01 | <0.01 | <0.01 | <0.01 | <0.01 |
| Other | <0.01 | <0.01 | <0.01 | <0.01 | <0.01 |

Examples 3, 4, and 5, when compared to Examples 1 and 2, show that the flame temperature decreases as the amount of water in the gas generating material is increased. The reduction in flame temperature is accomplished without significant change in CP/CV ratio or moles of gas produced.

The substitution of 5% by weight ethyl alcohol for 5% by weight polyvinyl alcohol in Examples 2, 3, 4, and 5 suppresses the freezing point of Examples 2, 3, 4, and 5 without adversely affecting the thermochemical combustion characteristics of Examples 2, 3, 4, and 5.

All of the Examples produced a gas product containing low amounts of carbon monoxide and nitrogen oxides.

Advantages of the present invention should be apparent. The gas generating material is particularly suitable for inflating an inflatable vehicle occupant protection device. The gas generating material upon combustion produces a gas product which is non-toxic and free of particulates. The present invention offers a means for providing relatively cool gas while at the same time increasing the volume of gas which is produced. Moreover, by using a porous, molded solid structure as the fuel, the burning rate of the gas generating material can be finely tuned by changing the surface area of the solid fuel, and is repeatable and predictable.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protection device comprising a pressurized container, a gas generating material stored under pressure in the container, and an igniter for igniting the gas generating material, the gas generating material comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water.

2. The apparatus of claim 1 wherein the polyvinyl alcohol is cross-linked.

3. The apparatus of claim 1 wherein the amount of nitrous oxide in the gas generating material is about 60% to about 95% based on the weight of the gas generating material.

4. The apparatus of claim 3 wherein the amount of polyvinyl alcohol in the gas generating material is about 5% to about 25% based on the weight of the gas generating material.

5. The apparatus of claim 1 wherein the oxidizer further comprises a supplemental oxidizer selected from the group consisting of salts of oxyacids of nitrogen, salts of oxyacids of chlorine, metal oxides and mixtures thereof.

6. The apparatus of claim 1 wherein the container also stores an inert gas selected from the group consisting of argon, helium, xenon, carbon dioxide, and mixtures thereof.

7. The apparatus of claim 1 wherein the oxidizer comprises at least about 95% nitrous oxide based on the weight of the oxidizer.

8. The apparatus of claim 1 wherein the fuel comprises at least about 95% polyvinyl alcohol based on the weight of the fuel.

9. The apparatus of claim 1 wherein the pore size of the polyvinyl alcohol is about 3 to about 20 microns.

10. The apparatus of claim 1 wherein the gas generating material further comprises a burn rate catalyst.

11. An apparatus for inflating an inflatable vehicle occupant protection device comprising a pressurized container, a gas generating material stored under pressure in the container, and an igniter for igniting the gas generating material, the gas generating material comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water, wherein the gas generating material further comprises an amount of water effective to cool the combustion products.

12. The apparatus of claim 11 wherein the amount of water is about 5% to about 15% water based on the weight of the gas generating material.

13. A gas generating material which when ignited produces gas to inflate an inflatable vehicle occupant protection device comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water.

14. The gas generating material of claim 13 wherein the polyvinyl alcohol is cross-linked.

15. The gas generating material of claim 13 wherein the amount of nitrous oxide in the gas generating material is about 60% to about 95% based on the weight of the gas generating material.

16. The gas generating material of claim 15 wherein the amount of polyvinyl alcohol in the gas generating material is about 5% to about 25% based on the weight of the gas generating material.

17. The gas generating material of claim 13 wherein the oxidizer further comprises a supplemental oxidizer selected from the group consisting of salts of oxyacids of nitrogen, salts of oxyacids of chlorine, metal oxides and mixtures thereof.

18. The gas generating material of claim 13 wherein the oxidizer comprises at least about 95% nitrous oxide based on the weight of the oxidizer.

19. The gas generating material of claim 13 wherein the fuel comprises at least about 95% polyvinyl alcohol based on the weight of the fuel.

20. The gas generating material of claim 13 wherein the pore size of the polyvinyl alcohol is about 3 to about 20 microns.

21. The gas generating material of claim 13 wherein the gas generating material further comprises a burn rate catalyst.

22. A gas generating material which when ignited produces gas to inflate an inflatable vehicle occupant protection device comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water, wherein the gas generating material further comprises an amount of water effective to cool the combustion products.

23. The apparatus of claim 22 wherein the amount of water is about 5% to about 15% water based on the weight of the gas generating material.

24. An apparatus for inflating an inflatable vehicle occupant protection device comprising a pressurized container, a gas generating material stored under pressure in the container, and an igniter for igniting the gas generating material, the gas generating material comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water; wherein the fuel further comprises about 1% to about 5% of an agent sufficient to suppress the freezing of the polyvinyl alcohol at or above about −40° C.

25. The apparatus of claim 24 wherein the agent is ethyl alcohol.

26. A gas generating material which when ignited produces gas to inflate an inflatable vehicle occupant protection device comprising an oxidizer and a fuel wherein at least a major portion of the oxidizer is nitrous oxide in a liquid-gas state and at least a major portion of the fuel is polyvinyl alcohol in a porous, molded solid state, a portion of the nitrous oxide being absorbed into the pores of the polyvinyl alcohol, the gas generating material upon combustion producing a combustion product consisting essentially of carbon dioxide, nitrogen, and water; wherein the fuel further comprises about 1% to about 5% of an agent sufficient to suppress the freezing of the gas generating material at or above about −40° C.

27. The gas generating material of claim 26 wherein the agent is ethyl alcohol.

* * * * *